United States Patent [19]

Desourdy

[11] 4,400,126
[45] Aug. 23, 1983

[54] ROADABLE STORAGE CONTAINER FOR BITUMINOUS MIX

[76] Inventor: Bernard Desourdy, 545 de Normandie St., Longueuil, Canada, J4H 3P6

[21] Appl. No.: 292,612

[22] Filed: Aug. 13, 1981

[51] Int. Cl.³ .............................................. B65G 65/32
[52] U.S. Cl. ..................................... 414/332; 366/30; 414/300; 414/328
[58] Field of Search .............. 414/269, 271, 293, 300, 414/328, 332, 919; 366/27, 30; 298/20 A

[56] References Cited

U.S. PATENT DOCUMENTS 2,953,410  9/1960  Chaney .......................... 298/20 A X
3,024,930  3/1962  Sims .................................... 414/332
3,406,847  10/1968 Sackett .......................... 414/300 X Primary Examiner—Robert G. Sheridan

[57] ABSTRACT

A roadable container or bin for storage of bituminous mix, at a road construction site and quickly erectable to an operative position, and which is characterized by a construction to avoid segregation of the particles in the bituminous mix, to avoid the need for a crane for its erection, and which includes a fuel compartment and a conveyor to dispense with the need for separate transportation of the same and producing a compact arrangement. The roadable storage container includes an elongated storage bin embodying a fuel tank, a bituminous mix compartment and a conveyor arranged to load the bituminous mix in that compartment, such as to avoid segregation of the constituents of the mix.

9 Claims, 5 Drawing Figures

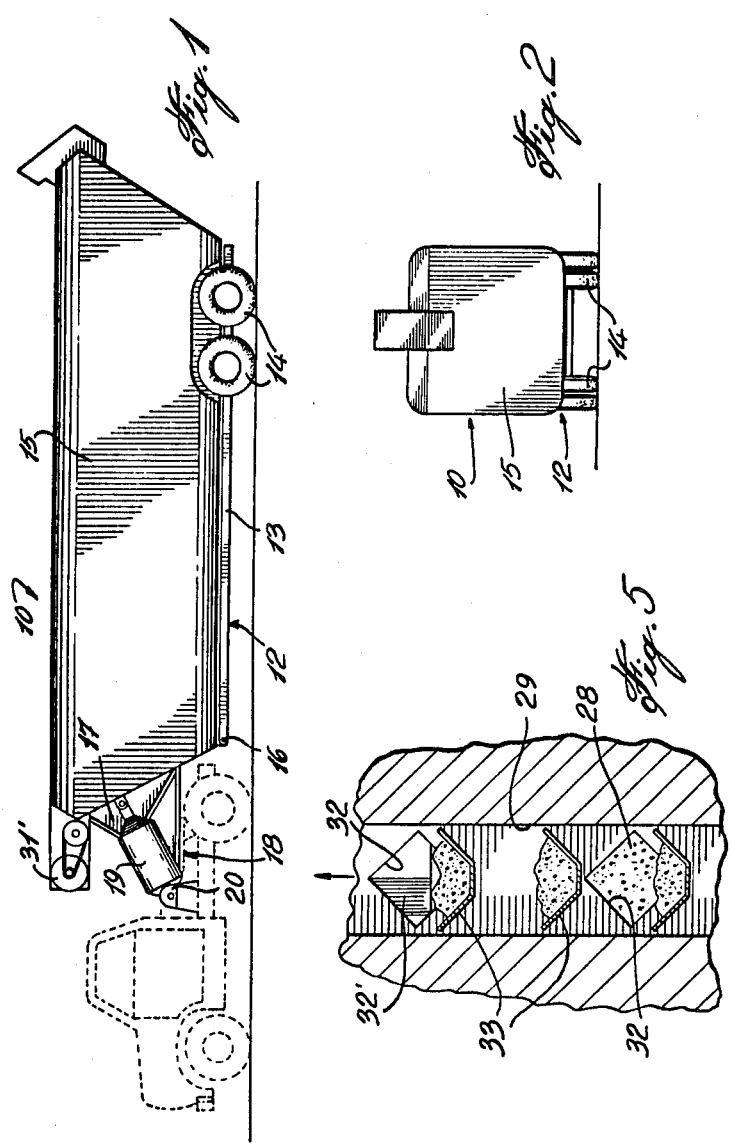

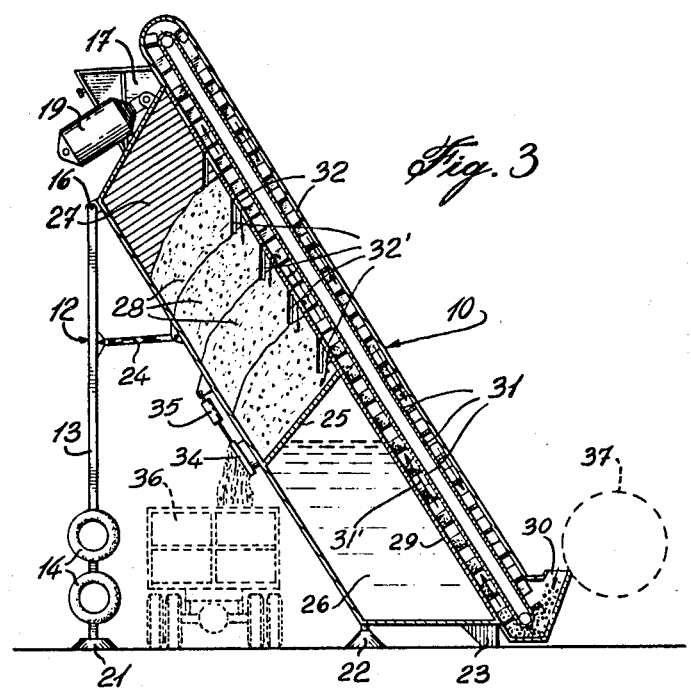
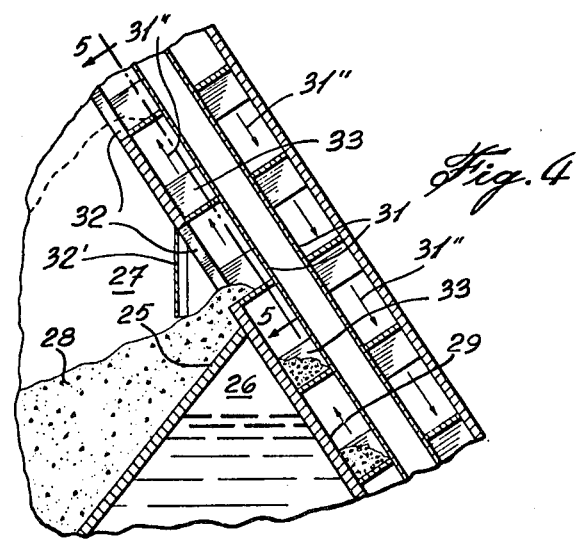

ROADABLE STORAGE CONTAINER FOR BITUMINOUS MIX

FIELD OF THE INVENTION

This invention relates to a container of the type that is roadable and transportable to a road construction site to hold a bituminous mix pending its delivery by trucks.

DESCRIPTION OF THE PRIOR ART

The containers or bins of the above type which have been used and proposed so far are facing an annoying problem of segregation of the components of the mix when they fall into it from the end of a conveyor at the top of the container. The common way to avoid undue segregation is to always keep the container at least half full, so that the incoming bituminous mix falls a shorter distance and is thus subject to less segregation. This is only partly satisfactory concerning segregation and, besides, it results that, in fact, only half of the container or bin is really useful. Those previous bins are erected by crane and thus need substantial time and labor before they are ready. Another disadvantage is that those bins are only made to store bituminous mix and the fuel used on the site and the conveyor to load such bin must come in other trucks.

SUMMARY OF THE INVENTION

It is a general object of the present invention to provide a roadable storage container of the above type, which substantially eliminates the problem of segregation in the bituminous mix that is loaded in it.

It is another object of the present invention to provide a roadable storage container of the above type which is self-erecting and which thus avoids the need of a crane for its erection on the construction site.

It is a further object of the present invention to provide a roadable storage container of the above type, which efficiently and fully uses its volume, not only to store a load of bituminous mix but also to carry required fuel and the conveyor needed to load the bituminous mix in it, and to thus avoid the need of other trucks to transport the fuel and the conveyor.

It is also an object of the present invention to provide a roadable storage container of the above type, which is roadable or towable on the road by a truck tractor and constructed and arranged to be readily lifted to an operative position.

It is still another object of the present invention to provide a roadable storage container of the above type that is provided with a conveyor arrangement particularly adapted to avoid loading of the bituminous mix by dropping it in the container from its top.

It is a still further object of the present invention to provide a roadable storage container that is provided with a bituminous mix compartment and a fuel compartment relatively positioned to assist the pivoting of the storage bin between its erected and its lowered positions and to allow positioning of the unloading or discharge outlet for convenient dumping into the trucks.

It is also an object of the present invention to provide a roadable storage container of the above type, which is adapted to provide loading inlets which are arranged to discharge the bituminous mix in the storage bin with minimum movement of the mix to thus minimize its segregation.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings, in which:

FIG. 1 is a side elevation view of a roadable storage container, according to the present invention and shown attached to a truck tractor drawn in dashed lines;

FIG. 2 is a rear view of the same roadable storage container;

FIG. 3 is a section taken longitudinally through the same roadable storage container with the latter shown in erected operative position;

FIG. 4 is an enlarged view of a portion of FIG. 3, particularly illustrating a section of a conveyor in the process of loading in bituminous mix in a compartment according to the present invention; and FIG. 5 is a cross-sectional view as seen along line 5—5 in FIG. 4;

The illustrated roadable storage container 10 is adapted to be towed by a truck tractor, of conventional construction. For that purpose, the roadable storage container 10 includes a trailer chassis and road wheel assembly 12.

The trailer chassis and road wheel assembly 12 comprises a trailer chassis or frame 13, of any appropriate and conventional construction, defining a front and a rear end. The rear end of the trailer chassis 13 is carried by road wheel assembly including the road wheels 14 and appropriate axle connection, not shown.

The roadable storage container includes an elongated storage bin 15 extending substantially co-extensive with the trailer chassis 13 and defining a front end and a rear end. The front end of the elongated storage bin is pivoted at 16 to the trailer chassis 13 about a transverse pivot axis to operatively pivot between a transport or roadable position in which it rests on the trailer chassis 13 and an erected inclined position, as shown in FIGS. 1 and 3, respectively. The elongated storage bin 15 is provided with a forward structure projection 17 at its front end for attachment to the truck trailer 10 by any appropriate fifth wheel assembly at 18. A telescopic hydraulic cylinder 19 is connected at one end to the structural projection 17 and has its other end connectable to a bracket 20 on the chassis of the truck tractor to elevate the elongated storage bin to its operative position, shown in FIG. 3. Pads 21, 22, and 23 are provided to support the trailer chassis and the storage bin in the elevated position. A brace 24 is connected in position between the trailer chassis and the storage bin to secure them relative to each other. The inside of the storage bin 15 is divided by a transverse partition 25 into a rear fuel tank at 26 and a front compartment 27 for bituminous mix 28. The fuel tank thus forms a ballast to assist the elevation of the storage bin to the position shown in FIG. 3.

The uppermost longitudinal surface portion of the elongated storage bin 15 forms a trough at 29 which longitudinally extends lengthwise of the bin. The trough 29 is formed with a rear open and providing an inlet at 30 for loading of the bituminous mix on the conveyor 31 of the drag type that runs in the trough 29 and extends substantially co-extensive therewith. Conveyor 31 is driven by a motor 31' in the direction of arrows 31". A series of loading inlet apertures 32 are provided in the trough 29 in registry with the bituminous mix compartment 27 and serially extend co-extensive therewith in the longitudinal direction of the bin 15. The loading inlet apertures 32 are geometrically shaped, such as a square, to define an apex pointing toward the upstream open end of the trough. Each inlet aperture 32 is provided with a baffle 32' extending from the top of aperture 32 downwardly into compartment 27. The drag conveyor 31 is provided with drag blades 33 of truncated V-shape configuration, as shown in FIG. 5. The lowermost longitudinal surface portion of the storage bin 15 is formed with an unloading aperture registering with the lowest rear end of the bituminous mix compartment 27. A trap door at 34, actuated by a hydraulic cylinder 35, selectively opens and closes the unloading aperture to unload bituminous mix into trucks 36.

After the storage bin has been towed to the proper road construction site, it is pivotally lifted by the cylinder 19 until its rear end is operatively mounted on the pads 22 and 23 and the trailer chassis 13 rests like a post on the pad 21 to support the front of the bin. The brace 24, or any other appropriate bracing, is then put in place to stabilize the bin.

A mixer and heater 37, of any appropriate construction, is positioned to discharge hot bituminous mix in the open inlet end of the conveyor assembly, so that the bituminous mix will be upwardly dragged by the blades 33. The bituminous mix is loaded in the compartment 27 through the loading apertures 32 first through the lowermost one and serially through the next ones in succession as they become successively filled. There results a progressive filling of the compartment 27 always through an aperture 32 which is not much higher than the level of material in the compartment at any particular time. This produces a sort of stratification in the bituminous mix compartment that is substantially free of segregation of the bituminous particles. The baffles 32' prevent the mix from re-entering the conveyor trough 29 through apertures 32.

The mixer heater 37 is fed with fuel oil from fuel tank 26 and it will be noted that conveyor through 29 is enclosed in bin 15, and that the latter can be heat insulated so that the mix can be kept hot for a long time. Also the full capacity of compartment 27 can be used, namely it can be emptied completely if called for by the scheduling of the delivery trucks 36.

I claim:

1. A roadable storage container for bituminous mix and comprising a trailer chassis and road wheel assembly, an elongated storage bin connected to the trailer chassis and road wheel assembly and defining a bituminous mix compartment and unloading outlet means in communication with the bituminous mix compartment, actuator means connected to the storage bin and operatively tilting the latter to a longitudinally-inclined operative position defining a lowermost longitudinal surface portion and an uppermost longitudinal surface portion, and conveyor means longitudinally extending lengthwise of the storage bin along the uppermost longitudinal surface portion thereof and including loading inlet means extending co-extensive and in communication with the bituminous mix compartment, lengthwise of the elongated storage bin, whereby the conveyor means is constructed and arranged for progressive filling of the bituminous mix compartment through the loading inlet means, said unloading outlet means including an unloading aperture through the lowermost longitudinal surface portion communicating with the bituminous mix compartment at a lowest point thereof, and a trap door selectively opening and closing the unloading aperture.

2. A roadable storage container as defined in claim 1, wherein the actuator means comprises a telescopic hydraulic cylinder connected at one end to the front end of the elongated storage bin and connectable at the other end to a truck tractor and constructed and arranged to upwardly lift the front end of the storage bin and hold the latter in the longitudinally-inclined operative position.

3. A roadable storage compartment as defined in claim 1, wherein the conveyor means comprises a trough longitudinally extending lengthwise along said uppermost longitudinal surface portion and having an open loading end rearward of the bituminous mix compartment and a drag conveyor extending longitudinally in the trough from the open loading end and forwardly of the latter into registry with the loading inlet means, and the latter constitutes a plurality of inlet apertures underlying the drag conveyor serially along the length thereof and communicating with the bituminous mix compartment.

4. A roadable storage container as defined in claim 3 further including a baffle extending from the top of each inlet aperture downwardly into said bituminous mix compartment.

5. A roadable storage container as defined in claim 3, wherein said inlet apertures geometrically define at least one apex with the latter pointing toward the upstream open end of the trough.

6. A roadable storage container as defined in claim 5, wherein the bituminous storage bin includes a fuel supply tank positioned rearward of the bituminous mix compartment and forming a ballast operatively assisting upward lifting of the storage bin by the actuator means.

7. A roadable storage container as defined in claim 6, wherein the trailer chassis and road wheel assembly includes a trailer chassis and a road wheel and axle assembly, the trailer chassis including a front end pivotally connected to the elongated storage bin about a transverse axis and a rear end operatively carried by the road wheel and axle assembly.

8. A roadable storage container as defined in claim 7, wherein the elongated storage bin includes a front end a rear end, a fifth wheel assembly secured to the front end of the elongated storage bin and constructed and arranged to support the same on the fifth wheel assembly of a truck tractor and for road transportation thereof to and from a construction site.

9. A roadable storage container as defined in claim 8, wherein the rear end of the elongated storage bin operatively forms a base constructed and arranged for resting of the bin thereon in the longitudinally-inclined operative position and the trailer chassis forms a post upwardly erected upon said tilting of the bin and operatively supporting the front end of the latter when lifted to the inclined position.

* * * * *